US005387064A

United States Patent [19]
Cardinal

[11] Patent Number: 5,387,064
[45] Date of Patent: Feb. 7, 1995

[54] MOVABLE SHELF STRUCTURE FOR TRUCK

[75] Inventor: John B. Cardinal, White Bear Lake, Minn.

[73] Assignee: Cardinal Materials Flow, Inc., St. Paul, Minn.

[21] Appl. No.: 167,183

[22] Filed: Dec. 16, 1993

[51] Int. Cl.[6] .................................................. B60R 9/55
[52] U.S. Cl. ..................................... 410/89; 224/281; 296/37.16; 414/522; 414/679
[58] Field of Search ................... 410/89; 414/331, 276, 414/491, 494, 462, 463, 466, 679, 522; 296/26, 37.16 R; 211/151; 224/310, 311, 281

[56] References Cited

U.S. PATENT DOCUMENTS

| 2,678,139 | 5/1954 | Gildersleeve | 414/522 |
| 3,369,684 | 2/1968 | Ford | 414/522 X |
| 4,033,620 | 7/1977 | Blake et al. | 414/679 X |
| 4,522,326 | 6/1985 | Tuohy, III | 224/310 |
| 5,037,153 | 8/1991 | Stark | 224/281 X |
| 5,064,335 | 11/1991 | Bergeron et al. | 414/522 |
| 5,088,636 | 2/1992 | Barajas | 224/315 X |
| 5,263,757 | 11/1993 | Reed | 296/37.16 X |

FOREIGN PATENT DOCUMENTS 0512791 11/1992 European Pat. Off. ............ 414/679

Primary Examiner—Michael S. Huppert
Assistant Examiner—James Eller
Attorney, Agent, or Firm—Leo Gregory

[57] ABSTRACT

For the enclosed compartment space of a truck type of automotive vehicle rearward of the cab seating section, particularly herein with reference to a mail delivery truck, a movable shelf supported on rollers running on ledges formed by the internal wheel wells of the body of the truck, the shelf carrying mail baskets therein, both the shelf and baskets thereon being easily reachable by the operator seated in the cab section by use of a hook equipped rod whereby the operator can move forwardly the shelf and baskets thereon to be readily reachable for access thereto without the operator being required to step down to have access to the same by an approach through the rear of the truck.

7 Claims, 3 Drawing Sheets

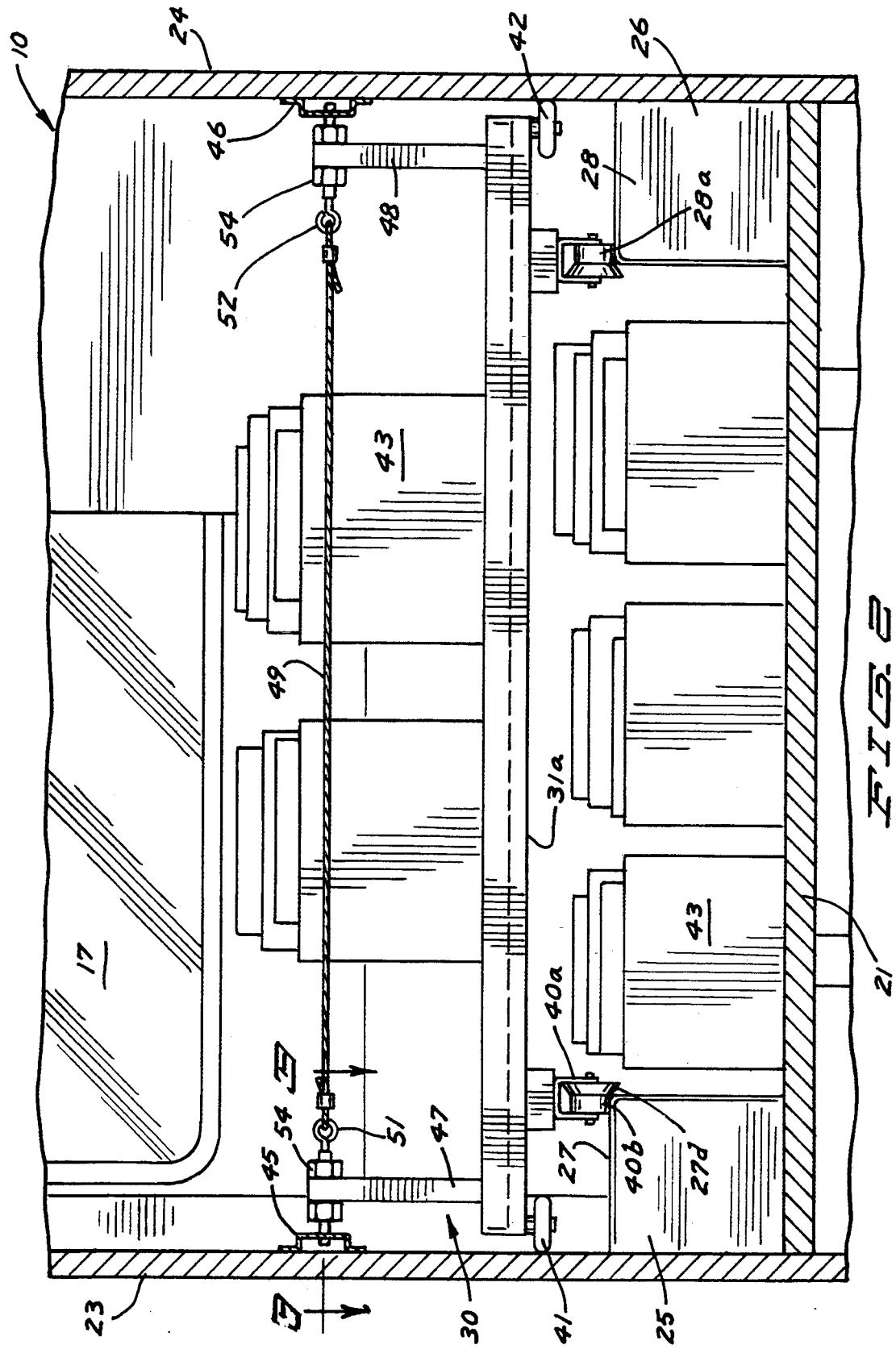

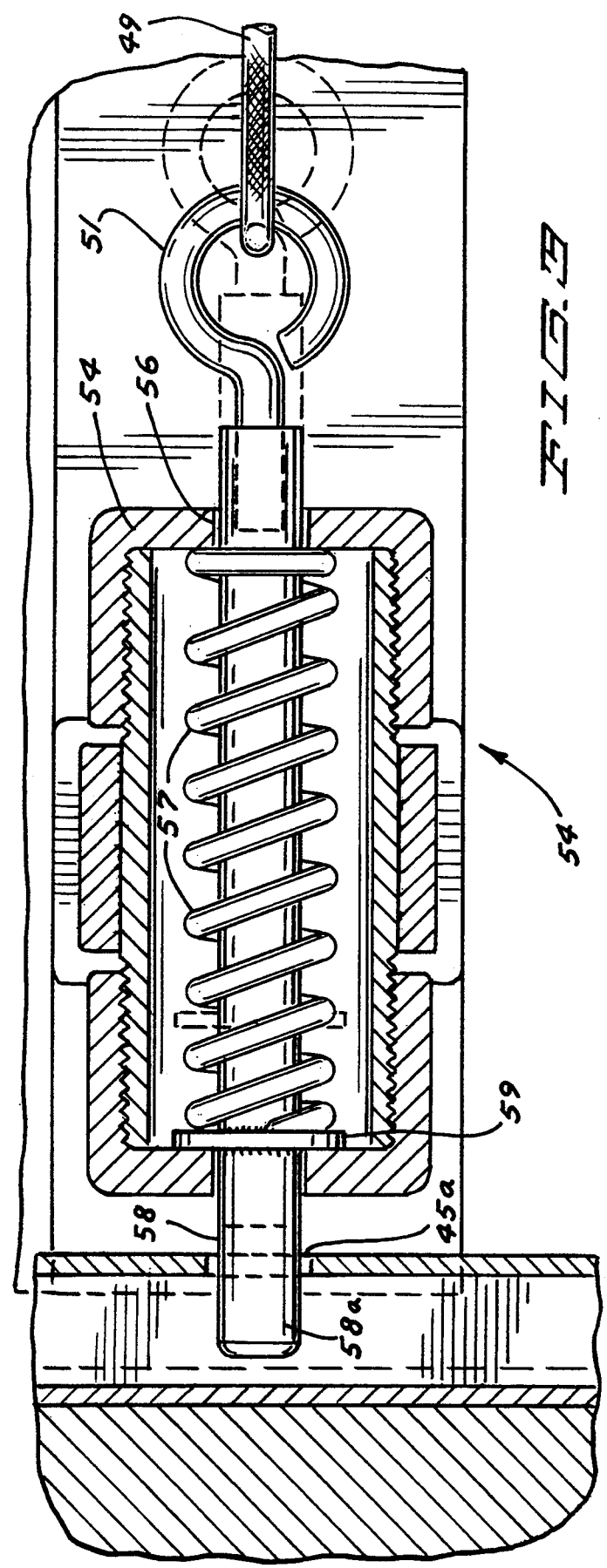

MOVABLE SHELF STRUCTURE FOR TRUCK

BACKGROUND OF THE INVENTION

1. Field of Invention

Relates to a movable shelf mounted in the rear compartment area of a truck reachable by the operator thereof through an opening in the rear wall of the seating cab section thereof.

2. Description of the Previous Art

There appears at the present time to be no known arrangement whereby the operator of a mail delivery truck type of automotive vehicle or like vehicle can by reaching rearwardly while seated and readily bring within his reach the mail baskets loaded in the rear compartment of his vehicle.

Further there appears to be no movable shelf arrangement in the rear compartment of truck, and more particularly in a mail delivery truck, readily movable the length of the rear compartment by the operator from his seat in the cab section.

In the absence of means to readily move a shelf and mail baskets thereon to be within his reach from his sitting position in the truck, the operator is required to be at the rear of the truck to move the mail baskets forwardly in the rear compartment of the truck to load the same and in like manner remove the mail baskets for distribution of mail therefrom.

SUMMARY OF THE INVENTION

It is an object of the invention herein to provide significant improvement in carrying means, with respect to a mail truck for example, for making readily accessible to the operator, in his seated position, mail filled baskets loaded into the rear compartment of the truck.

More particularly it is an object herein to provide means whereby the operator from his seated position is able to reach and move forwardly the mail baskets loaded in the rear compartment of his truck.

It is a further object herein to provide as a built-in arrangement in the rear compartment as of a mail truck, a shelf movable on rollers supported by a ledge at each inner side wall of said rear compartment which can be engaged by the operator to move the same to be reachable by hand.

It is also an object herein to lock said shelf into any desired position lengthwise of the rear compartment.

These and other objects and advantages of the invention will be set forth in the following description made in connection with the accompanying drawings in which like reference characters refer to similar parts throughout the several views.

BRIEF DESCRIPTION OF THE DRAWINGS

FIG. 2 is a broken view in vertical section taken on line 2—2 of FIG. 1 as indicated; and FIG. 3 is a broken view in vertical section on an enlarged scale taken on line 3—3 of FIG. 2 as indicated showing a piece of operating structure.

DESCRIPTION OF A PREFERRED EMBODIMENT

Figure 1:
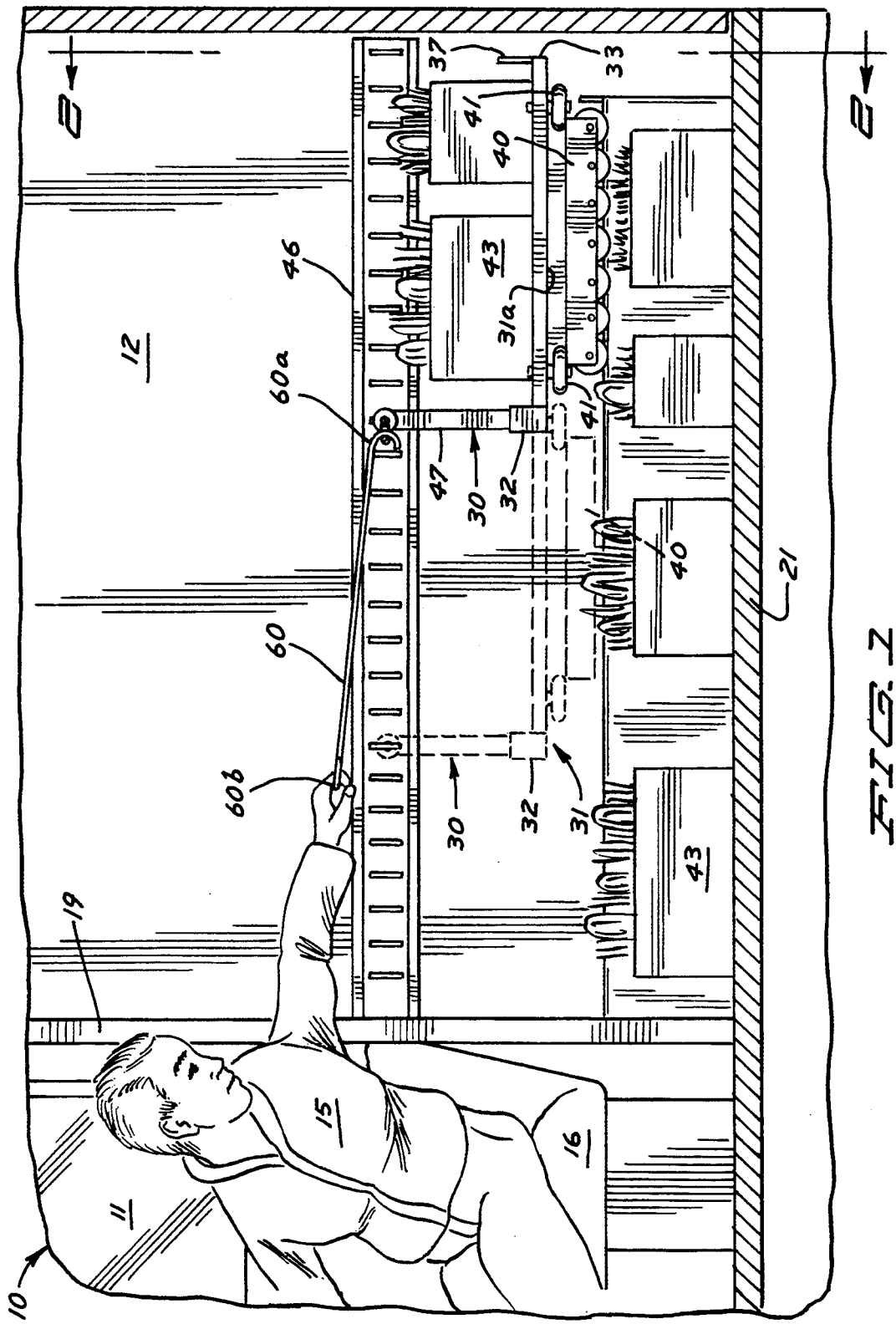
FIG. 1 is a broken partial view in longitudinal vertical section of cab and rear compartment of a truck type of an automotive vehicle.

Referring to the drawings and more particularly to FIGS. 1 and 2, and a partial interior arrangement or structure of the interior of a truck type of automotive vehicle 10 is indicated, this being of a type used for mail deliveries of which the forward cab or operators seating section is indicated at 11 and the rear compartment thereof is indicated at 12.

With reference to FIG. 1, the operator 15 is shown in his driving seat 16. A partially glassed wall 17 separates the drivers compartment or cab section 11 from the rear compartment 12, however there is an opening 19 in said wall 17 directly to the rear of said operator 15 and said operator can turn and reach through said opening 19 as shown in FIG. 1.

Now specific reference will be had to the rear compartment 12. The wall structure of said compartment 12 is conventional including the floor 21 and the top wall or ceiling thereof which is not shown.

The side walls are indicated at 23 and 24. The wheel wells of said truck, not shown exteriorly, have projections 25 and 26 extending inwardly of said rear compartment along the side walls upwardly of the bottom wall thereof. Said inward projections form ledges 27 and 28 as shown.

Adapted to be mounted upon said ledges is a movable shelf 30. Said shelf may be made very suitably of a rectangular sheet of ⅜" plywood which may be treated with a polyethelene plastic protective coating for a long wearing surface. Said shelf may have a very practical length on the order of 60 to 66 inches and a width as will be described.

Said shelf comprises a bottom wall 31 and end walls 32 and 33 with said wall 33 being well shown in FIG. 2, the same indicating a width just short of engagement with the corresponding side walls of said rear compartment. The length of said shelf is indicated by wall 35 representing both side walls.

Carried on said shelf are mail baskets 43.

Extending about said bottom wall and suitably secured thereto is a raised ledge 37.

Supporting said shelf upon said ledges as illustrated in FIGS. 1 and 2 are roller carriages 40 comprising conventional channel brackets 40a having a plurality of rollers 40b mounted therein as shown in FIG. 2. Said carriages are mounted fore and aft of the underside 31a of said bottom wall 31 being positioned to have the rollers engage and ride on the edge portions 27 and 28 of said ledges as indicated at 27a and 28a. Thus said shelf has free movement lengthwise of said rear compartment. Said bottom wall 31 is raised sufficiently to permit mail baskets 43 to be placed thereunder.

Spaced along at said underside 31a of said bottom wall of said shelf to extend outwardly thereof are front and rear pairs 41 and 42 of side rollers which are disposed horizontally to engage their corresponding side walls 23 and 24 for a free moving guided engagement therewith.

Secured to each side wall of said rear compartment spaced upwardly somewhat of said shelf 30 are rails 45 and 46 comprising horizontally spaced openings such as vertical slots therein the length thereof.

Upstanding from each side of said shelf as from the midpoints thereof are posts 47 and 48 which are shown here in FIG. 1 to be seated in sockets. Extending between said posts is a cable 49 which is secured to loops 51 and 52 at its ends. Said loops are respectively a part of or integral with a locking arrangement represented by the locking device 54 as shown in FIG. 3.

Said cable may very suitably be made of a nylon cord or a nylon strap which have sufficient strength for their intended purpose as will be described.

Referring to FIG. 3 in which the locking device is shown on an expanded scale, a rectangular housing 55 is integral with and extends outwardly from each side of post 47 and having a passage 56 extending therethrough and through said post and within said passage is a captive coil spring 57. Extending through said housing and passage and through said spring therein is a pin 58, preferably a steel pin and with said spring in extended position, a washer 59 having a diameter equal to that of said spring faces the extended end of said spring and is secured to said pin with said pin being in its extended position as illustrated. The extended end 58a of said pin is disposed into a slot 45a of said rail 45 whereby the position of said shelf is locked or latched.

As shown in dotted or broken line, said pin upon being withdrawn from said slot by a pull on the cable 49 pulls the washer 59 to compress the coil spring 57 which upon a release of the cable automatically causes the pin to become re-inserted into whatever other slot it is aligned with by movement of the shelf.

Referring to FIG. 1, for convenience in moving said shelf by the operator, an elongated rod 60 is provided having a hook 60a at its fore end to engage the cable 49 at its other end for convenient hand holding is a loop 60b.

OPERATION

The operation for use of the shelf herein is fairly self evident. As illustrated in FIG. 1, it is very convenient for the operator or delivery person to use the rod 60 to pull on the cable 49 and draw the shelf and the mail baskets thereon to be within his arms reach to be lifted out through the window 19 is required for distribution of mail.

The shelf elevates the baskets to a convenient level for lifting thorugh the window 19. As the baskets are withdrawn from the shelf, said rod 60 may be used to bring forward to be adjacent the window 19 the baskets which are on said shelf remote from said window.

It will of course be understood that various changes may be made in the form, details, arrangement and proportions of the invention herein without departing from the scope thereof which generally stated, consists in a product capable of carrying out the objects above set forth, such as disclosed and defined in the appended claims.

What is claimed is:

1. A truck having a forward seating cab and an enclosed rear compartment, having in combination
a side wall at each side of said compartment,
a movable shelf substantially rectangular in plan view extending between said side walls,
a ledge along each of said side walls formed by inward projections of exterior wheel wells of said truck,
vertically disposed rollers underlying said shelf positioned to engage and roll on said ledge,
horizontally disposed rollers underlying said shelf positioned to respectively engage said side walls to space said shelf therefrom and to guide said shelf for free forward and rearward movement in said compartment,
a rail along each side wall positioned above the level of said shelf,
each said rail having horizontally spaced slots therein,
a spring loaded slot engaging device at each side of said shelf having pins adapted to engage slots in alignment therewith to restrain said shelf from movement along said ledge, means for mounting said slot engaging device,
a cable interconnecting said slot engaging devices for withdrawing said pins from said slots for movement of said shelf along said ledge,
an open window from said cab into said rear compartment, and
engaging means for an operator in said cab to reach through said window to engage said cable to thereby disengage said pins from said slots and move said shelf to be accessible to said operator.

2. The structure of claim 1, wherein said shelf is adapted to carry mail baskets thereon.

3. The structure of claim 1, including a raised ledge extending about said shelf.

4. The structure of claim 1, wherein said cable is formed of nylon material.

5. The structure of claim 1, wherein said means for mounting said slot engaging device comprises a post upstanding at each side of said shelf.

6. The structure of claim 1, wherein said means for mounting said slot engaging device comprises a post upstanding at each side of said shelf,
a housing at the top of each of said posts,
a passage through each of said housings and said post,
a coil spring in each of said housings and in said passages therein,
said pins extending through each of said housings and coil springs projecting to enter a slot,
a washer in each of said housings secured to said pins extending therethrough engaging the extended ends of said springs,
said cable connecting said pins,
whereby a pull on said cable withdraws said pins from slots engaged thereby for movement of said shelf.

7. The structure of claim 1, wherein said engaging means comprises a rod having a hooked end for engagement of said cable by said operator to release said shelf for movement.

* * * * *